A. Day,
Cutting Shingles.
Nº 21,490.      Patented Sep. 14, 1858.

UNITED STATES PATENT OFFICE.

AUGUSTUS DAY, OF DETROIT, MICHIGAN.

SHINGLE-MACHINE.

Specification of Letters Patent No. 21,490, dated September 14, 1858.

*To all whom it may concern:*

Be it known that I, AUGUSTUS DAY, of Detroit, in the county of Wayne and State of Michigan, have invented a new and Improved Machine for Riving, Jointing, Planing, and Squaring Shingles at One and the Same Operation; and I do hereby declare that the following is a full, clear, and exact description of the same, reference being had to the annexed drawings, making a part of this specification, in which—

Figure 1:
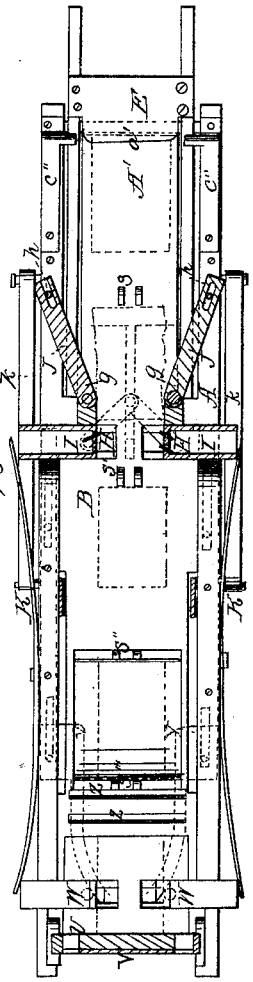
Figure 2:
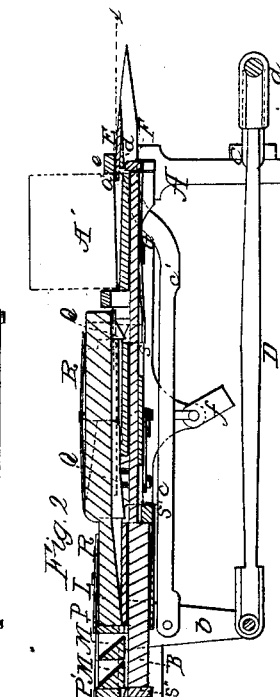
Figure 4:
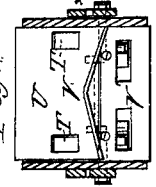
Figure 3:
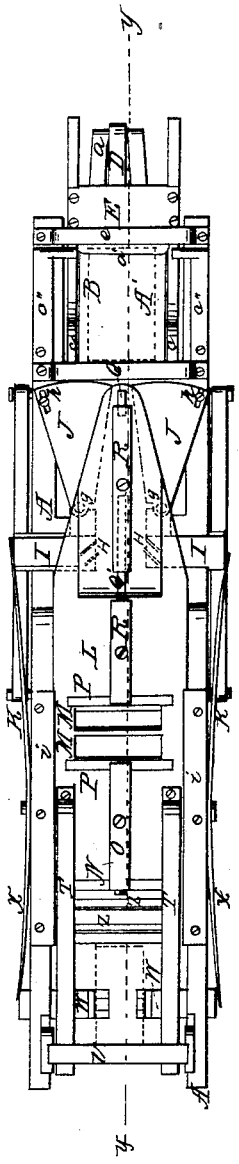

Figure 1, is a horizontal section of my improvement taken in the line $x$, $x$, Fig. 2. Fig. 2, is a side sectional elevation of ditto, taken in the line $y$, $y$, Fig. 3. Fig. 3, is a plan or top view of ditto. Fig. 4, is a transverse section of ditto taken in the line $z$, $z$, Fig. 2.

Similar letters of reference indicate corresponding parts in the several figures.

This invention consists in the employment or use of a riving or splitting knife, jointing cutters, planers and a squaring knife, arranged, operated and used in connection with retaining dogs and other concomitant parts as hereinafter shown and described, whereby the several operations of riving or splitting, jointing, planing and squaring, may be done by one and the same machine, at one operation and the work performed expeditiously and in a perfect manner.

To enable those skilled in the art to fully understand, construct and use my invention, I will proceed to describe its construction and operation.

A, represents a suitable framing which supports a bed-piece B, said bed-piece being in a horizontal position and of oblong rectangular form. In the lower part of the framing A, at one end a driving shaft C, is placed, said shaft having a crank $a$ at its center, and a crank or driving pulley at one end. To the crank $a$, one end of a connecting rod D, is attached, the opposite end of said rod being attached by pendents $b$, to two rods $c$, $c$, which are of curved form as shown clearly in Fig. 2, the front ends of said rods passing up through slots in the bed-piece B, one at each side and having a riving or splitting knife E, attached. This knife is of slightly taper form and has a projection $d$, on its under side, said projection being within a short distance of its back edge as shown clearly in Fig. 2. In the end of the framing A, and opposite the cutting edge of the riving knife E, a retaining dog F, is placed. This dog extends the whole width of the frame its ends being fitted in oblong slots made therein so as to allow a certain degree of vertical play and a spring G, bears against the under side of the dog, said spring having a tendency to keep the dog at its highest point, see Fig. 2. The dog F, is fitted underneath a cross bar $e$, on the framing. To the under side of the framing A, there are secured two cams $f$, one at each side. These cams are pivoted to the frame and are placed directly underneath the rods $c$, $c$, so that they will raise the same during the forward movement of the riving knife E, as will be hereinafter more particularly referred to.

H, H, are jointing cutters which are fitted in stocks I, I, placed transversely on the bed-piece B, so that they may slide freely thereon. To the stocks I, guard plates J, J, are attached one to each, these guard plates are of taper or segment form, one end being pivoted to the stocks as shown at $g$, and the opposite ends slotted and attached to the framing by screws or bolts $h$, which pass through the slots, the slots being near the outer edges of the guard plates see Fig. 3. A spring K, bears against the outer edge of each cutter stock I, said springs having a tendency to keep the cutters pressed inward toward each other to their fullest extent.

L, represents a reciprocating slide which is fitted horizontally between guides $i$, $i$, on the framing, one at each side. The slide L, is connected to the pendents $b$, and consequently it moves simultaneously with the rods $c$, $c$, and riving knife E. In the slide L, planers M, M, are placed, and a dog N, is attached to its back or outer end, said dog having a spring O, bearing on its upper surface. Dogs P, P', are also fitted in the slide, one at each end of the throats of the planers M, and dogs Q, Q', are placed in the slide longitudinally at its center and near its front end. These dogs all have springs R, bearing on their upper surfaces.

In the bed-piece B, spring dogs S, S', S'', S''', are placed, see Figs. 1 and 2, and to the back end of the slide L, two curved arms T, T, are attached, one to each side. These arms pass through a gate U, which is fitted vertically in the back end of the framing A, and has a knife V, fitted therein, the cutting of said knife being of V-form, see Fig. 4.

W, W, are clamps which are placed on the bed-piece B, and allowed to slide transversely thereon. The outer edge of each clamp has a spring X, bearing against it. To each clamp W, a pendent pin $j$, is attached, and to the under side of the bed B, two slides Y, Y, are secured. The outer ends of these slides are curved toward each other as shown by the dotted lines in Fig. 1, and they are actuated at the proper time by the riving-knife rods $c$, $c$, as will be hereinafter described. The slides Y, Y, have elastic straps $k$, attached to them, one to each. In the bed-piece B, planers Z, Z, are placed.

The operation is as follows:—The bolt A′, shown in red and from which the shingles are cut is placed on the bed B, directly in front of the cutting edge of the riving knife E, which is thrown back underneath the guard plates J, J. Motion is then given the shaft C, by any proper means and the knife E, is moved forward and cuts a shingle from the bolt, the cams $f$, which act upon the rods $c$, at points $c'$, see Fig. 2, elevate the knife E, at the back part of its stroke, the knife being thereby allowed to gradually follow the grain of the wood as it moves forward and being kept in proper position by springs $c''$. As the knife E, moves forward the front ends of the rods $c$, $c$, depress the dog F, which holds the shingle in proper place after it is separated or fully cut from the bolt, the latter being retained by the cross piece $e$. When the knife reaches this position, that is, the termination of its forward stroke, the back edge of the knife which is provided with a lip $a'$, formed by the projection $d$, is not entirely under the cross piece, but is thus arranged to hold up the bolt, and prevent the knife on its backward movement from catching the bolt, but at the same time the shoulder or projection $d$, underneath will pass over the dog F, and catch against the edge of the shingle, the bolt in consequence of resting on the lip $a'$, serving to keep the knife in proper position. The springs $c''$, prevent the knife E, from slipping over the shingle and press down the dog F, so that the knife will be certain to catch the shingle on its backward motion. The shingle is then carried back by the knife E, and strikes against the guides J, J, of the jointing cutters H, H, and forces said cutters apart, the shingle being held in the mouth of the jointers by the spring dogs S, until the next revolution, when it is carried still farther back and through or between the jointing cutters by the dog Q, in the slide L, and the shingle is jointed thereby. At the same time another shingle is riven from the bolt and carried to the mouth of the jointing cutters, the first being fully jointed, but not entirely out of the jointers, before the next is introduced. The first shingle passes by the last jointer cutter before the other comes in, so as to allow any variation in the increase or diminution of the shingle, and when the shingle has passed through the jointers they (the jointers) return to their original position by the operation of the springs K, on the sides of the bed B. After leaving the jointing cutters H, H, the shingle is caught by another dog S′, in the bed B, and held until the next succeeding dog Q′, in the slide L, takes it. It is thus carried still farther along or back to an inclined surface $b'$, in the bed B, when the upper planers M, M, plane the upper surface and give it the proper taper, the cutters moving parallelly and the shingle lying with the butt dropped down by reason of the inclined surface $b'$, in the bed B. The shingle is then forced up against an upper inclined planer $b''$, on the slide L, by the dogs S‴, in front of the lower planers Z, and carried over them by the spring dog P′, behind the planers M, in the slide L, and the under surface of the shingle is planed and also tapered or diminished. The shingle then drops on the lower bed piece B, and is caught by the clamps W, W, and brought into a parallel position and held while the squaring knife V, cuts off the end, said knife being operated by the curved arms T, T. If desired the ends of the shingles may be chamfered or beveled by placing the guides of the knife V, and gate U, in an inclined position. The clamps W, are opened by the slides Y, Y, under the bed B. When the knife V, is elevated sufficiently high for the shingle to clear it, the shingle is forced out by the dog N, at the end of the slide L. At the end of the bed B, there is placed a stationary knife V′, which is adjusted by means of set screws so that it may be always placed in a proper relative position with the knife V.

Having thus described my invention what I claim as new and desire to secure by Letters Patent, is,

1. The butting or squaring knife V, operated by the curved arms T, and used in connection with the stationary knife V′, and adjusting clamps W.

2. The combination of the riving knife E, jointing cutters H, H, planers M, M, and Z, Z, and butting or squaring knives V, V′, the whole being arranged to operate as and for the purpose set forth.

AUGUSTUS DAY.

Witnesses:
Wm. J. Speed,
Geo. B. Ensworth.